M. GOHLKE.
JOURNAL BEARING.
APPLICATION FILED FEB. 28, 1910.
1,096,805.
Patented May 12, 1914.
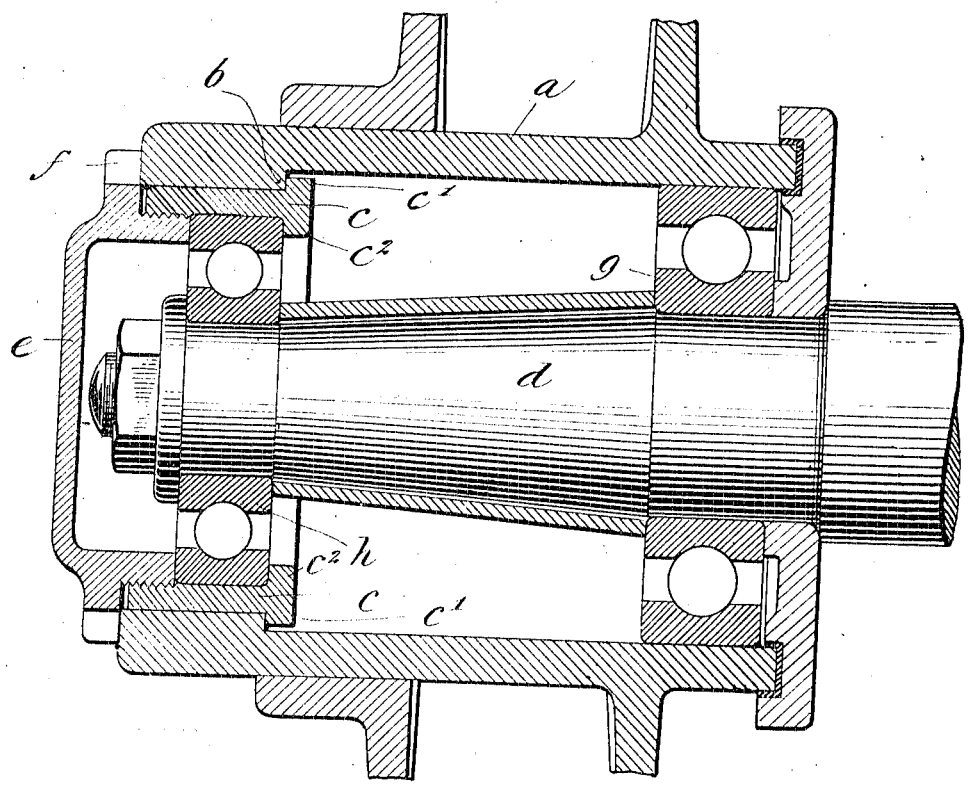
Witnesses:
Inventor
Max Gohlke
By his Attorneys

UNITED STATES PATENT OFFICE.

MAX GOHLKE, OF BERLIN, GERMANY.

JOURNAL-BEARING.

1,096,805.

Specification of Letters Patent.

Patented May 12, 1914.

Application filed February 28, 1910. Serial No. 546,463.

*To all whom it may concern:*

Be it known that I, MAX GOHLKE, a subject of the Emperor of Germany, residing at Berlin, Germany, have invented certain new and useful Improvements in Journal-Bearings, of which the following is a specification, reference being had therein to the accompanying drawing.

My invention relates to journal bearings, and more particularly to that class thereof wherein anti-friction devices are employed.

My improved mechanism is chiefly designed to provide means whereby the shaft and casing are normally secured in proper relations to each other, and whereby when desired they may be separated with the minimum of trouble and disorganization. To these ends, the shaft has mounted upon it a projecting part, which is preferably in the form of an anti-friction bearing, and intermediate locking devices are employed to engage the casing and the projecting part at opposite sides thereof. Specifically, these locking devices comprise a sleeve flanged at one edge thereof to engage the casing and the bearing, and a cap secured to the other end of the sleeve and also engaging the bearing and casing, in such manner that the several parts are firmly held together. The disengagement of the cap from the sleeve permits the separation of the shaft and casing without necessitating the removal of the bearing, as is generally required in constructions of this kind.

In the preferred embodiment of my invention illustrated in the accompanying drawing, I have shown it as applied to a form of wheel hub, wherein the casing rotates about the shaft, but obviously the same principles may be applied to the reverse of this construction, wherein the casing is stationary and the shaft rotates within it. These and many other variations will suggest themselves to those skilled in the art without departing from the spirit of my invention.

Generally speaking, I desire to be understood that I do not limit myself to any specific form or details except in so far as such limitations are specified in the claims.

The accompanying drawing illustrates in longitudinal section a form of wheel hub and axle embodying my invention.

As is customary in mechanism of this character, the shaft or axle $d$ is located within the casing $a$, and interposed between them are anti-friction bearings $g$ and $h$ of any suitable type securely mounted on the shaft and permitting the free relative movement of the parts. The casing $a$ has a plain and unobstructed bore which allows it to be passed freely in both directions over the inclosed elements. At its outer end, it is provided with an internally projecting flange $b$, which is located in proximity to the outer bearing $h$. Between the bearing and the flange are mounted the locking devices, comprising, in the form illustrated, the sleeve $c$ and the cap $e$. The sleeve $c$ is formed with an outwardly projecting flange $c^1$ to engage the flange $b$ of the casing $a$, and with an inwardly projecting flange $c^2$ to engage the outer ring of the bearing $h$. At the opposite side of the bearing $h$ is located the cap $e$, which is connected to the sleeve $c$ in any suitable manner, as by screw-threads, and which rests against the bearing $h$, and, by means of the projecting flange $f$, against the outer edge of the casing $a$. It will be obvious that by turning the cap $e$ with reference to the sleeve $c$, the several parts will be secured firmly in place and to each other, and that by freeing the cap $e$ from its engagement with the sleeve $c$, the casing $a$ may be readily removed, and without disturbing the interior parts or necessitating the removal of the anti-friction bearings.

The ball-bearings $g$ and $h$ illustrated in the drawing are shown simply by way of example, as obviously any desired form of anti-friction bearing could be substituted therefor, however constructed and assembled. In assembling the parts the ball-bearings $g$ and $h$ are first mounted upon the shaft or axle $d$, with the sleeve $c$ located in position around the bearing $h$. After this the casing $a$ is passed over both bearings, which is permitted because of its cylindrical bore. The construction and arrangement of the casing $a$ at its inner side is immaterial to the present invention. After the casing $a$ is thus located in position the cap $e$ is applied to the outer screw-threads of the sleeve $c$, by which the latter is drawn into close relation to the bearing $h$ and to the flange $b$ of the casing $a$ in the manner previously described.

Having thus described my invention, its construction and mode of operation, what

I claim and desire to secure by Letters Patent of the United States is as follows:

1. In a journal bearing, the combination of a casing formed with an inwardly projecting abutment, a shaft and a projecting member mounted thereon, with a sleeve located between the casing abutment and the projecting member and formed at its inner edge to engage both of them, and a cap detachably secured to the sleeve and engaging the casing and member at the opposite side thereof.

2. In a journal bearing, the combination of a casing formed with an inwardly projecting flange, a shaft, and an anti-friction bearing mounted thereon, with a sleeve located between the casing flange and the bearing, and formed at its inner edge with outwardly and inwardly projecting flanges to engage both of them, and a cap detachably secured to the sleeve and engaging the casing and the bearing at the outside thereof.

In testimony whereof I have affixed my signature in presence of two witnesses.

MAX GOHLKE.

Witnesses:
 HENRY HASPER,
 WOLDEMAR HAUPT